United States Patent
Chou

(10) Patent No.: US 9,677,961 B2
(45) Date of Patent: Jun. 13, 2017

(54) PRESSURE INDICATOR WITH PRESSURE-RELIEF FUNCTION

(71) Applicant: Wen-San Chou, Tainan (TW)

(72) Inventor: Wen-San Chou, Tainan (TW)

( * ) Notice: Subject to any disclaimer, the term of this patent is extended or adjusted under 35 U.S.C. 154(b) by 38 days.

(21) Appl. No.: 14/851,272

(22) Filed: Sep. 11, 2015

(65) Prior Publication Data

US 2016/0076957 A1 Mar. 17, 2016

(30) Foreign Application Priority Data

Sep. 15, 2014 (TW) .............................. 103132328 A

(51) Int. Cl.
*G01L 7/16* (2006.01)
*G01L 19/06* (2006.01)
*F16K 37/00* (2006.01)

(52) U.S. Cl.
CPC .............. *G01L 7/166* (2013.01); *F16K 37/00* (2013.01); *G01L 7/163* (2013.01); *G01L 19/0618* (2013.01)

(58) Field of Classification Search
None
See application file for complete search history.

(56) References Cited

U.S. PATENT DOCUMENTS

| 2016/0076534 A1* | 3/2016 | Chou | ............... F04B 33/005 |
| | | | 73/168 |
| 2016/0076963 A1* | 3/2016 | Chou | ............... F04B 35/01 |
| | | | 73/756 |

* cited by examiner

*Primary Examiner* — Andre Allen

(57) ABSTRACT

A pressure indicator with a pressure-relief function is disclosed, which can release excessive pressure to the environment. The pressure indicator includes a transparent tube defining therein a first bore and a second bore, and a slider which can be forced by the medium supplied from an external pressure source to move along the first and second bores of the transparent tube. In particular, the first bore has a diameter greater than the second bore, and a tapered annular surface is provided between the first bore and the second bore of the transparent tube. When the pressure of the medium exceeds a predetermined pressure, the slider can be forced by the medium to reach the tapered annular surface, at which excessive medium can be released into the environment via an annular gap between the slider and the tapered annular surface.

10 Claims, 12 Drawing Sheets

PRESSURE INDICATOR WITH PRESSURE-RELIEF FUNCTION

TECHNICAL FIELD OF THE INVENTION

The present invention relates to a pressure indicator with a pressure-relief function and, more particularly, to a pressure indicator that is provided with a pressure relieving means, which allows excessive pressure to be released into the environment when a high pressure occurs, in addition to the capability of measuring pressure.

DESCRIPTION OF THE PRIOR ART

Conventionally, pressure indicating devices cannot release excessive pressure into the environment. Thus, when they are employed at a device connected with a pressure source, such as an air compressor, an object connected with the pressure source will be probably damaged due to overpressure if no safety valves are installed at the device.

For solving the shortcoming of conventional pressure indicating devices, after numerous experiments and investigations, the applicant has contrived a pressure indicator, which can quickly release excessive pressure into the environment, thus preventing an object from be damaged due to overpressure.

SUMMARY OF THE INVENTION

One object of the present invention is to provide a pressure indicator with a pressure-relief function, which can quickly release excessive pressure into the environment when a high pressure occurs.

According to one feature of the present invention, the pressure indicator includes a transparent tube and a slider mounted in the transparent tube, whereby the slider can be forced by the medium supplied from an external pressure source to move, in a way similar to a piston, along the transparent tube. The pressure of the medium supplied from the external pressure source can be measured from the length of the movement of the slider.

According to another feature of the present invention, the transparent tube has a first segment and a second segment, wherein the first segment defines therein a first bore, and the second segment defines therein a second bore, the first bore having a diameter greater than the second bore. In particular, a tapered annular surface is provided between the first bore of the first segment and the second bore of the second segment. When the pressure of the medium supplied from the external pressure source exceeds a predetermined pressure, the slider can be forced by the medium to reach the tapered annular surface, at which excessive medium can be released to the environment.

Other objects, advantages, and novel features of the present invention will become more apparent from the following detailed description when taken in conjunction with the accompanying drawings.

DETAILED DESCRIPTION OF THE PREFERRED EMBODIMENTS

Figure 3:
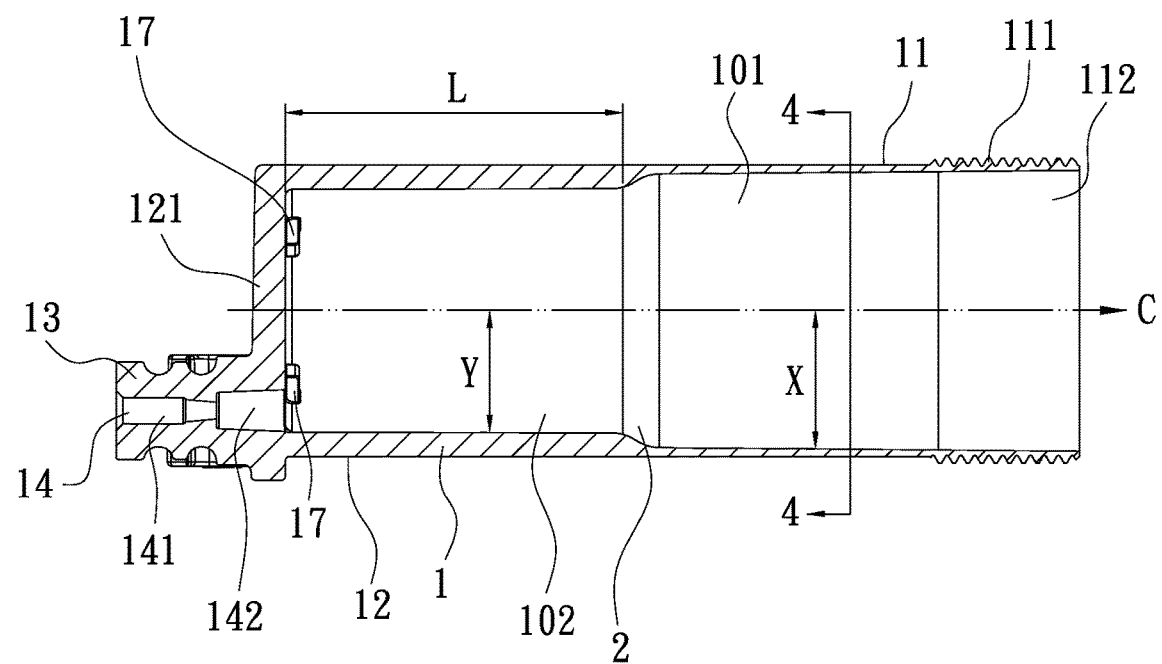
FIG. 3 shows a sectional view of a transparent tube used in the pressure indicator.
Figure 4:
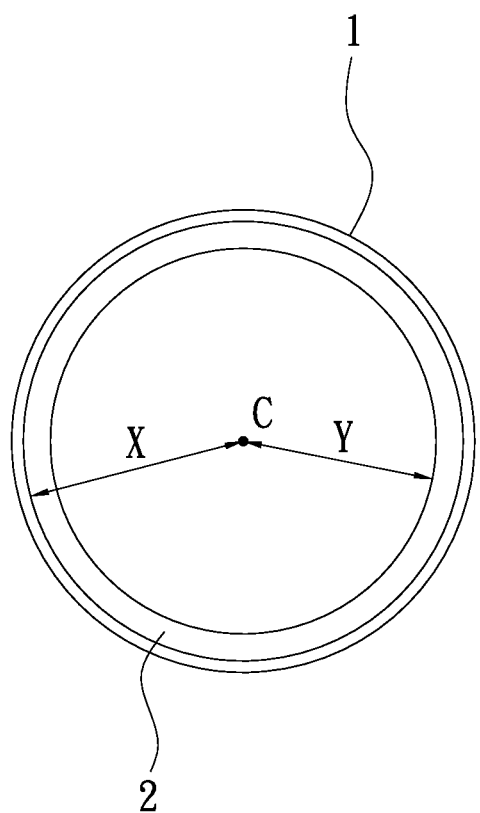
FIG. 4 shows a sectional view taken along line 4-4 in FIG. 3.

Referring to FIGS. 1 through 5, a pressure indicator with a pressure-relief function according to one embodiment is shown, which generally comprises a transparent tube 1, a slider 3, a coiled compression spring 4, and a cap 5, wherein the transparent tube 1 has a first segment 11 and a second segment 12. The second segment 12 of the transparent tube 1 has an end wall 121 provided with a connection fitting 13 which defines therethrough an air channel 14 being composed of a small-diameter channel 141 and a large-diameter channel 142, and through which an external pressure source containing a medium, such as compressed air, can be connected to the transparent tube 1. The first segment 11, which is formed integrally with the second segment 12, has an open end 112 provided with external threads 111. The first segment 11 of the transparent tube 1 defines therein a first bore 101 which opens out at the open end 112. The second segment 12 of the transparent tube 1 defines therein a second bore 102 which communicates with the first bore 101 of the first segment 11. As shown in FIGS. 3 and 4, the radius of the first bore 101 of the first segment 11 is indicated by X, which is the distance between the central axis C and the inner surface of the first segment 11 that defines the first bore 101; the radius of the second bore 102 of the second segment 12 is indicated by Y, which is the distance between the central axis C and the inner surface of the second segment 12 that defines the second bore 102, wherein X is greater than Y. As shown, a tapered annular surface 2 is formed between the inner surface of the first segment 11 and the inner surface of the second segment 12. The tapered annular surface 2 is provided for connecting two tube segments of different diameters. Although this embodiment provides the tapered annular surface 2, which extends outwardly with the central axis of the transparent tube 1 in a linear path, a curved annular surface, which extends outwardly with the axis of the transparent tube 1 in a curved path, can be used as well. The inner surface of the end wall 121 is provided with a plurality of buffering pads 17. The connection fitting 13, by which the transparent tube 1 can be connected to an external pressure source, is provided with an O-ring 19 at its outer surface. The small-diameter channel 141 of the air channel 14 is provided with a buffering plug 18 to moderate instantaneous pressure from the external pressure source. The second segment 12 of the transparent tube 1 is provided with a pressure-indicating scale.

Figure 5:
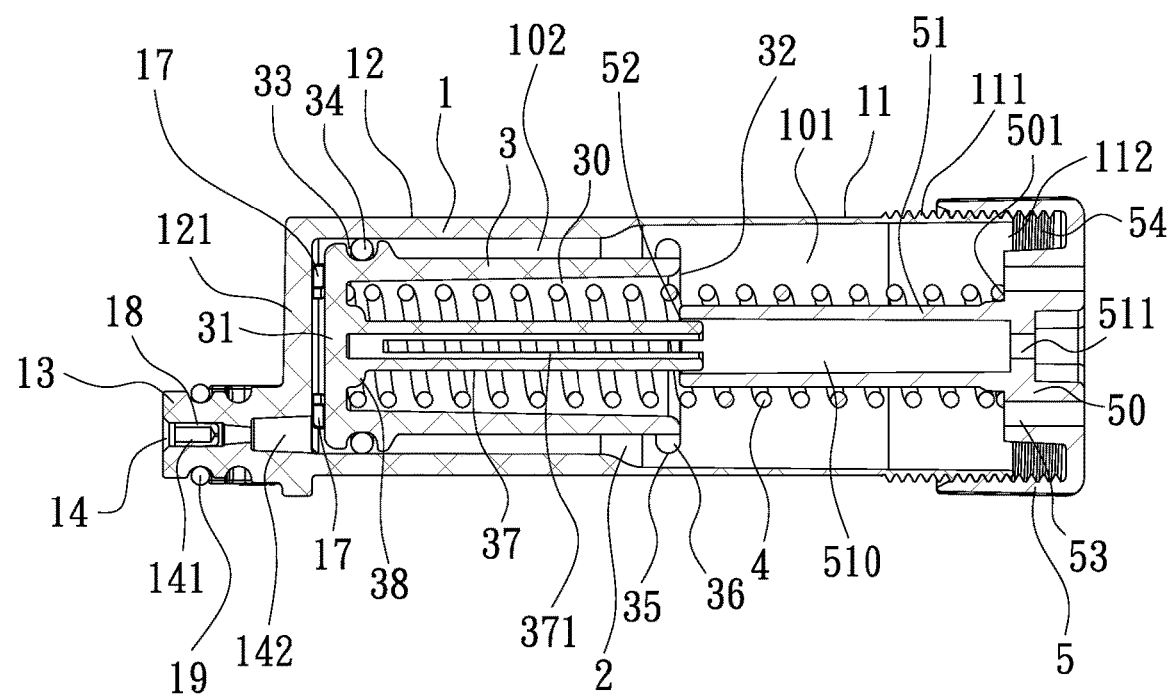
FIG. 5 shows a sectional view of the pressure indicator, which is at its original state.
Figure 6:
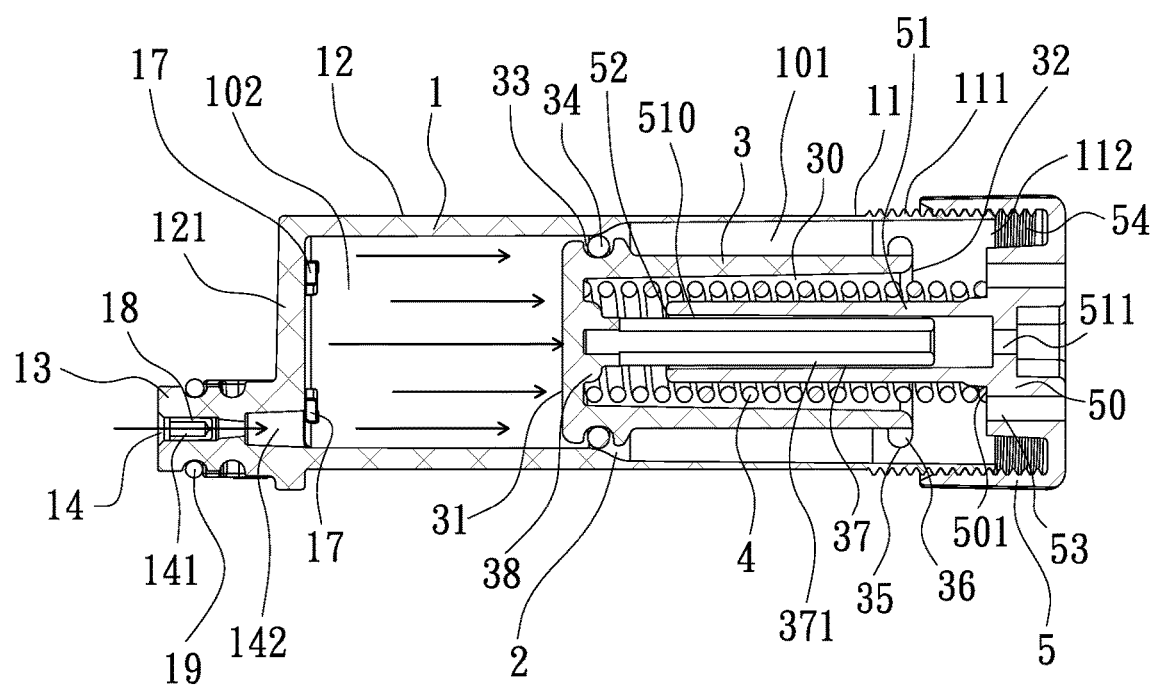
FIG. 6 shows a sectional view of the pressure indicator, wherein the slider is forced by the medium supplied from an external pressure source to move towards the open end of the transparent tube.

The slider 3 is mounted in the transparent tube 1. When the medium supplied from the pressure source enters the transparent tube 1 via the air channel 14 of the connection fitting 13 to force the slider 3 to move along the transparent tube 1. According to the length of the movement of the slider 3, the pressure of the medium can be obtained. The length (L) of the second segment 12 of the transparent tube 1, which is parallel to the axis (C) of the transparent tube 1, is designed according to the working pressure of the pressure source. For an external pressure source with a higher pressure, the length (L) of the second segment 12 can be increased. On the other hand, for an external pressure source with a lower pressure, the length (L) of the second segment 12 can be decreased. The slider 3 is shaped as a generally hollow cylindrical body which has an open end 32 and a closed end 31 opposite to the open end 32 thereof and defines therein an inner space 30. The slider 3 has a central tube 37 which extends from an inner surface of the closed end 31, through the inner space 30, to go beyond the open end 32. Furthermore, the slider 3 is provided with an annular outwardly protruding edge 35 at its open end 32. A step 38 is formed between the inner surface of the closed end 31 and the central tube 37 of the slider 3. The central tube 37 of the slider 3 defines a plurality of spaced slits 371 along its outer surface. The slider 3 defines at its surrounding wall, near its closed end 31, an annular groove 33 to be fitted with a colored O-ring 34. The slider 3 can be fitted in the transparent tube 1 and cooperated with the coiled compression spring 4. The air channel 14, which is composed of the small-diameter channel 141 and the large-diameter channel 142, communicates with the first and second bores 101, 102 of the transparent tube 1. The medium supplied from an external pressure source can force the slider 3 to move, in a way similar to a piston, along the first and second bores 101, 102 of the transparent tube 1, as shown in FIGS. 5 and 6.

The coiled compression spring 4 is received in the inner space 30 of the slider 3 and fitted around the central tube 37 of the slider 3, wherein one end of the coiled compression spring 4 is urged against the inner surface of the closed end 31 of the slider 3. The coiled compression spring 4 slightly contacts an inner surface of the slider 3 that defines the inner space 30 (see FIG. 5). As such, the closed end 31 of the slider 3 can be forced by the coiled compression spring 4 to abut against the buffering pads 17 of the transparent tube 1.

Figure 1:
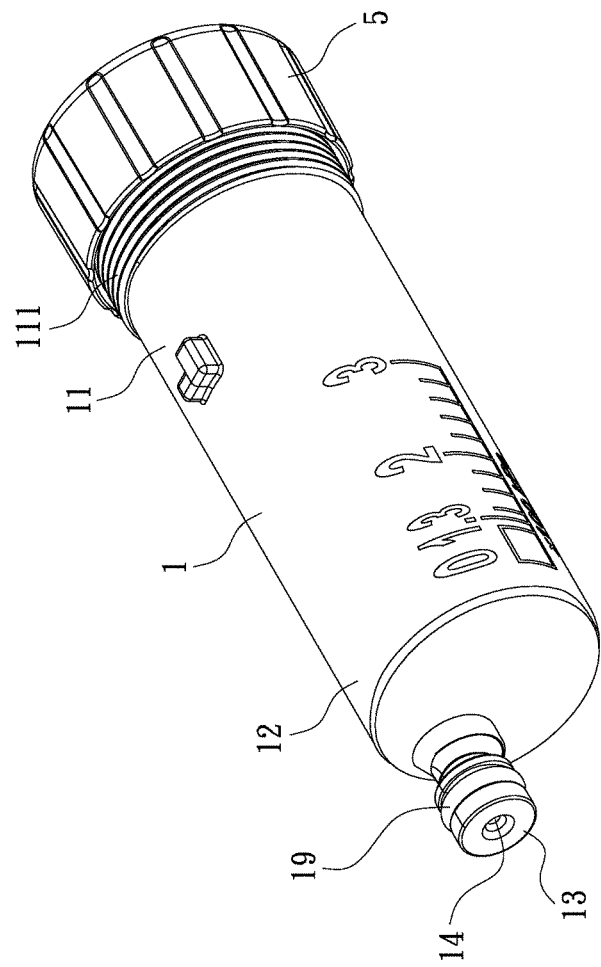
FIG. 1 shows a 3-dimensional view of a pressure indicator according to one embodiment of the present invention.
Figure 2:
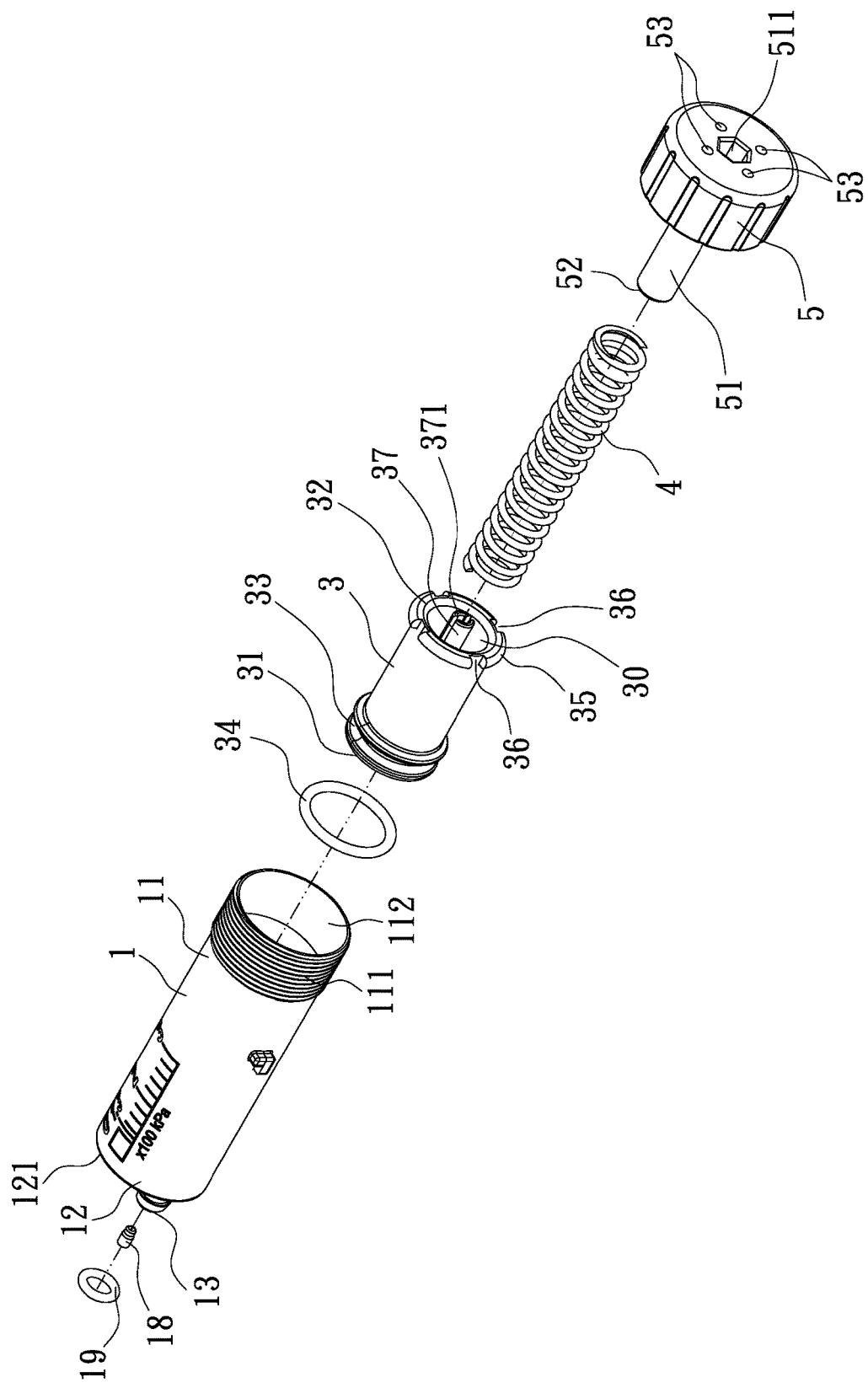
FIG. 2 shows an exploded view of the pressure indicator.

Referring again to FIGS. 2 and 5, the cap 5 has an inner base 50 and a central tube 51 extending from the inner base 50. Furthermore, the cap 5 is provided at its inner surface with internal threads 54, corresponding to the external threads 111 provided at the open end 112 of the first segment 11 of the transparent tube 1, for being threadedly mounted to the open end 112 of the first segment 11. The central tube 51 of the cap 5 has a diameter less than the inner base 50 such that an annular surface 501 is formed between the inner base 50 and the central tube 51. Furthermore, the central tube 51 of the cap 5 has an open end 52 opposite to the inner base 50 and defines therein a central hole 510 which opens out at the open end 52, wherein the central hole 510 of the central tube 51 of the cap 5 has a diameter greater than the central tube 37 of the slider 3, but the diameter of the central tube 51 being less than the internal diameter of the coiled compression spring 4. The other end of the coiled compression spring 4 is urged against the annular surface 501 of the inner base 50 of the cap 5. After the cap 5 has been threadedly mounted to the open end 112 of the transparent tube 1 through engagement between the external threads 111 and the internal threads 54, the central tube 51 of the cap 5 can fit around the central tube 37 of the slider 3 via its open end 52, wherein the diameter of the central tube 37 of the slider 3 is slightly less than that of the central hole 510 of the central tube 51 of the cap 5. The compression of the coiled compression spring 4 can be adjusted by the depth of the cap 5 being threadedly mounted to the open end 112 of the first segment 11, so that the pressure of the medium supplied from the external pressure source can be measured more properly. Furthermore, the inner base 50 of the cap 5 defines therethrough a central through hole 511 communicating with the central hole 510 of the cap 5, and defines a plurality of peripheral through holes 53 around the central through hole 511 thereof, which communicates with the first bore 101 of the first segment 11 of the transparent tube 1. The transparent tube 1, the slider 3, the colored O-ring 34, the coiled compression spring 4, and the cap 5 are assembled to form the embodiment of the pressure indicator as shown in FIG. 1.

Figure 7:
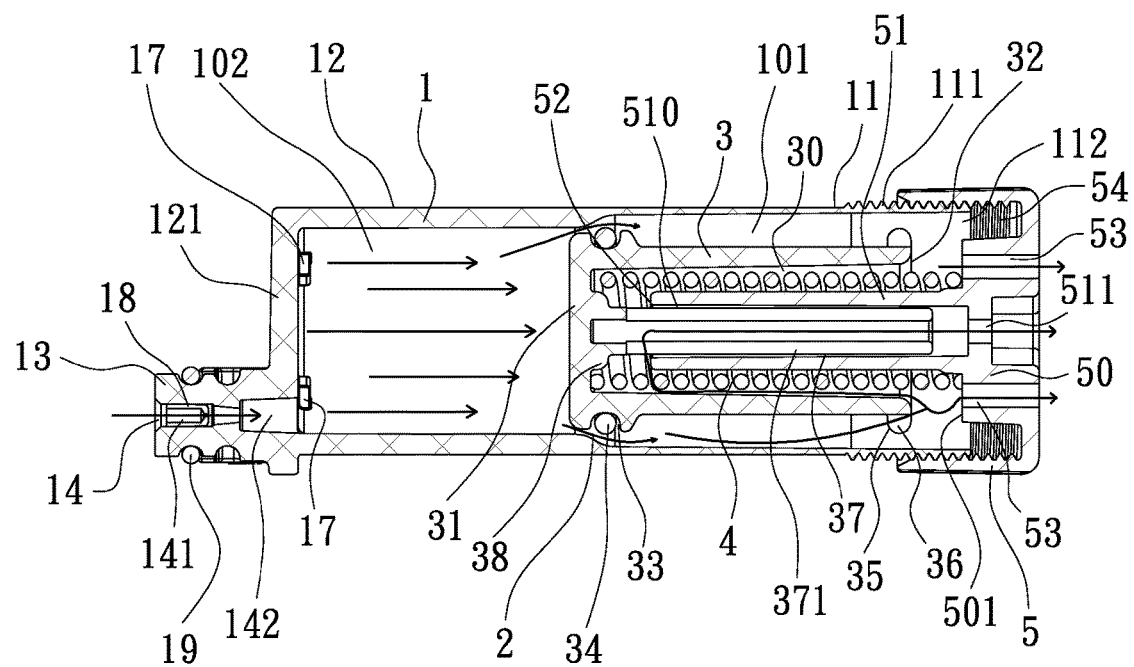
FIG. 7 shows a sectional view of the pressure indicator, wherein the slider is moved further to reach a tapered annular surface of the transparent tube by the medium which exceeds a predetermined pressure.
Figure 8:
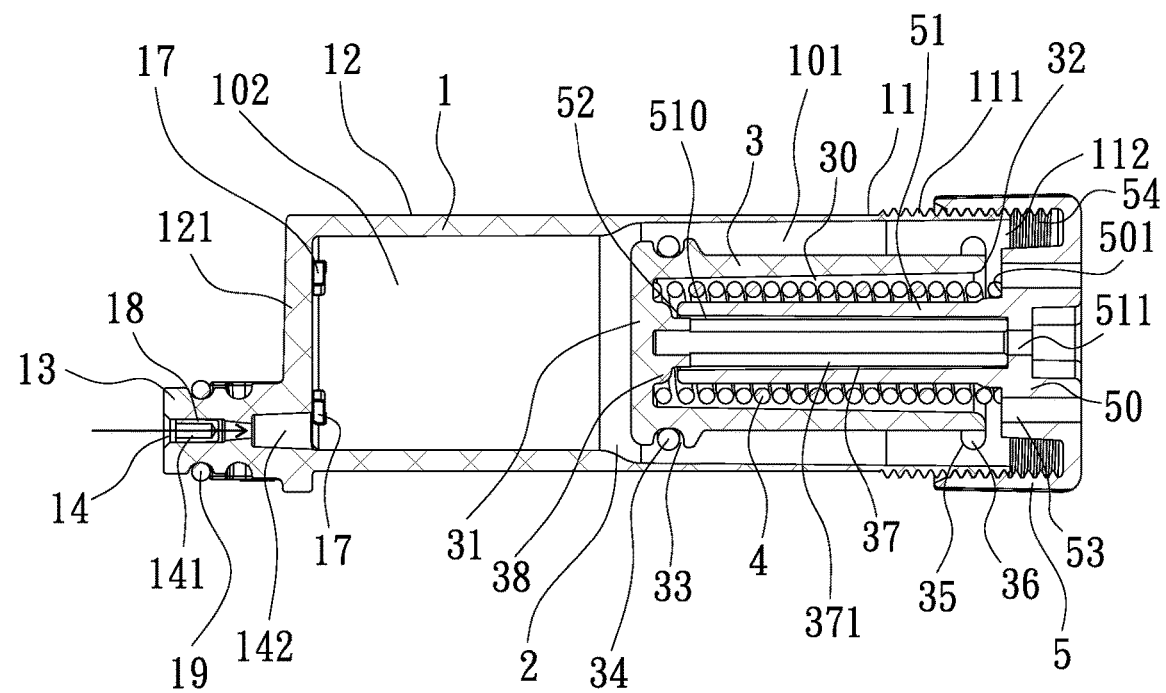
FIG. 8 shows a sectional view of the pressure indicator, wherein the slider is moved to its ultimate position.

Referring again to FIGS. 1 and 5, in operation, the medium supplied from an external pressure source can flow into the transparent tube 1 via the air channel 14 of the connection fitting 13, wherein the medium can pass through the small-diameter channel 141, in which the buffering plug 18 is fitted for moderating instantaneous pressure surge of the medium, before passing through the large-diameter channel 142. Thereafter, the medium can overcome the coiled compression spring 4 to have the slider 3 moved towards the open end 112 of the transparent tube 1 and the cap 5. According to the pressure-indicating scale provided on the transparent tube 1, the position of the colored seal ring 34 provided on the slider 3 with respect to the pressure-indicating scale, which reflects the pressure of the medium supplied from the external pressure source, can be clearly seen through by a user. The operation of the pressure indicator for measuring the pressure of the medium is shown in FIGS. 5 and 6. After the external pressure source is disconnected from the pressure indicator, the coiled compression spring 4 can force the slider 3 to return to its original position, as shown in FIG. 5. In particular, in operation, when the pressure of the medium supplied from the external pressure source exceeds a predetermined pressure, the slider 3 can be moved from the second bore 102 of the second segment 12 to the first bore 101 of the first segment 11. The colored O-ring 34 of the slider 3 can reach the tapered annular surface 2 of the transparent tube 1, wherein an annular gap is existed between the colored O-ring 34 and the tapered annular surface 2 (see FIG. 7), so that some of the excessive medium may flow through the annular gap to enter the first bore 101 of the first segment 11 and then pass through the peripheral through holes 53 to flow out of the pressure indicator. In addition, some of the excessive medium may enter the inner space 30 of the slider 3 via the spaced cuts 36, and then flow into the central hole 510 of the cap 5 via the slits 371 of the central tube 37 of the slider 3, and finally pass through the central through hole 511 of the cap 5 to be released into the ambient environment, so that an object connected to the external pressure source can be protected from damages due to overpressure. Furthermore, under an excessive pressure, the step 38 formed between the inner surface of the closed end 31 and the central tube 37 of the slider 3 may contact the end of the central tube 51 of the cap 5 to prevent the coiled compression spring 4 from being excessively compressed (see FIG. 8), so that deformation of the coiled compression spring 4 can be avoided.

Figure 9:
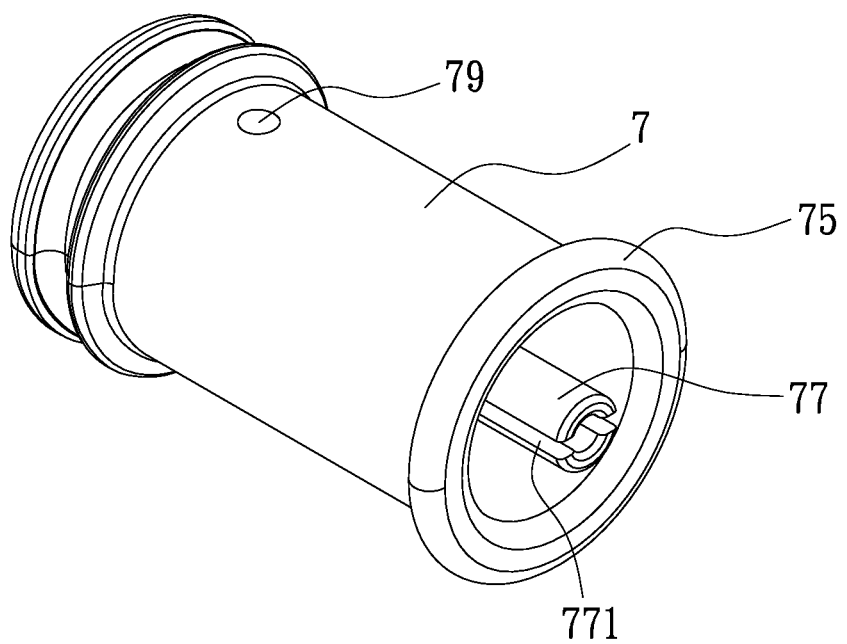
FIG. 9 shows a second embodiment of the slider used in the pressure indicator.
Figure 10:
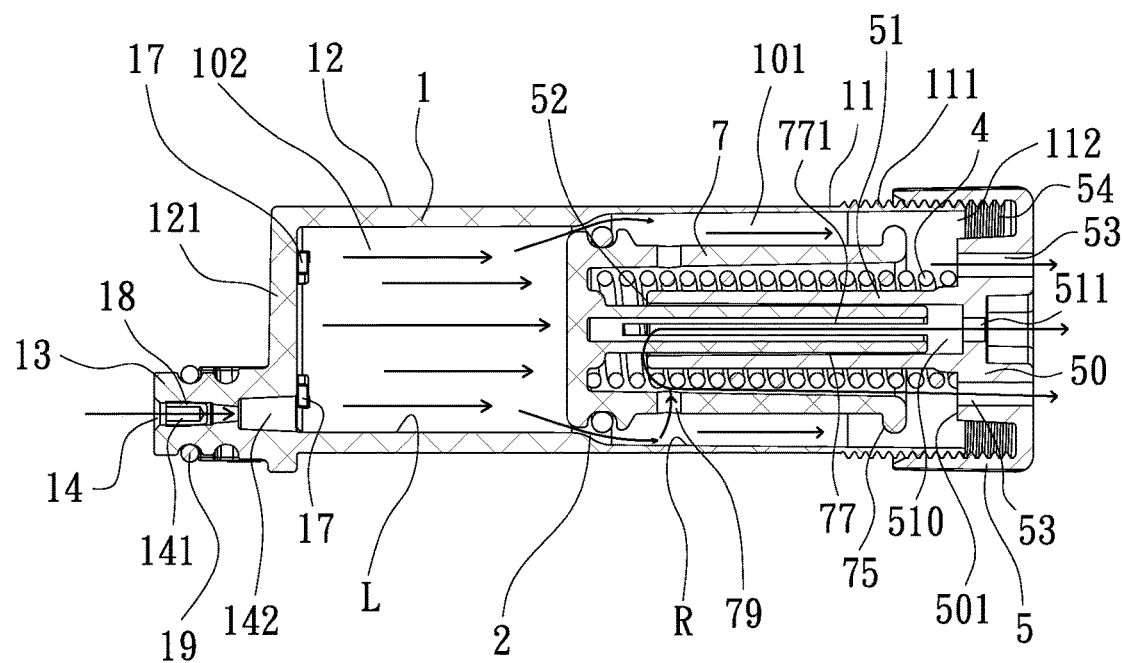
FIG. 10 shows a sectional view of the pressure indicator, wherein the second embodiment of the slider is moved to the tapered annular surface of the transparent tube by the medium which exceeds a predetermined pressure.

FIGS. 9 and 10 show a second embodiment of the slider used in the pressure indicator, wherein the slider 7 has an open end with an annular outwardly protruding edge 75 and a closed end opposite to the open end thereof and defines therein an inner space. Also, the slider 7 has a central tube 77 which extends from an inner surface of its closed end, through the inner space thereof, to go beyond the open end thereof. The central tube 77 of the slider 7 defines a plurality of spaced slits 771 along its outer surface. In particular, the slider 7 defines a vent hole 79 at its surrounding wall. When the pressure of the medium supplied from an external pressure source exceeds a predetermined pressure, the slider 7 can be moved from the second bore 102 of the second segment 12 to the first bore 101 of the first segment 11. The colored O-ring of the slider 7 can reach the tapered annular surface 2 of the transparent tube 1, wherein an annular gap is existed between the colored O-ring and the tapered annular surface 2 (see FIG. 10), so that some of the excessive medium may flow through the annular gap to enter the first bore 101 of the first segment 11 and then pass through the peripheral through holes 53 to flow out of the pressure indicator. In addition, some of the excessive medium may enter the inner space of the slider 7 via the vent hole 79, and then flow into the central hole 510 of the cap 5 via the slits 771 of the central tube 77 of the slider 7, and finally pass through the central through hole 511 of the cap 5 to be released into the ambient environment, so that an object connected to the external pressure source can be protected from damages due to overpressure.

Figure 11:
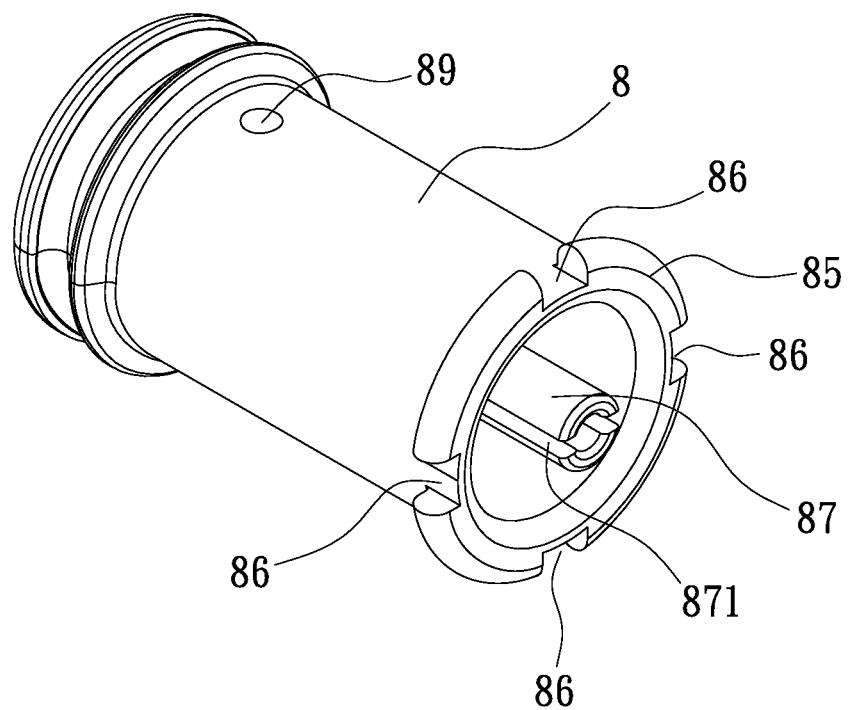
FIG. 11 shows a third embodiment of the slider used in the pressure indicator.
Figure 12:
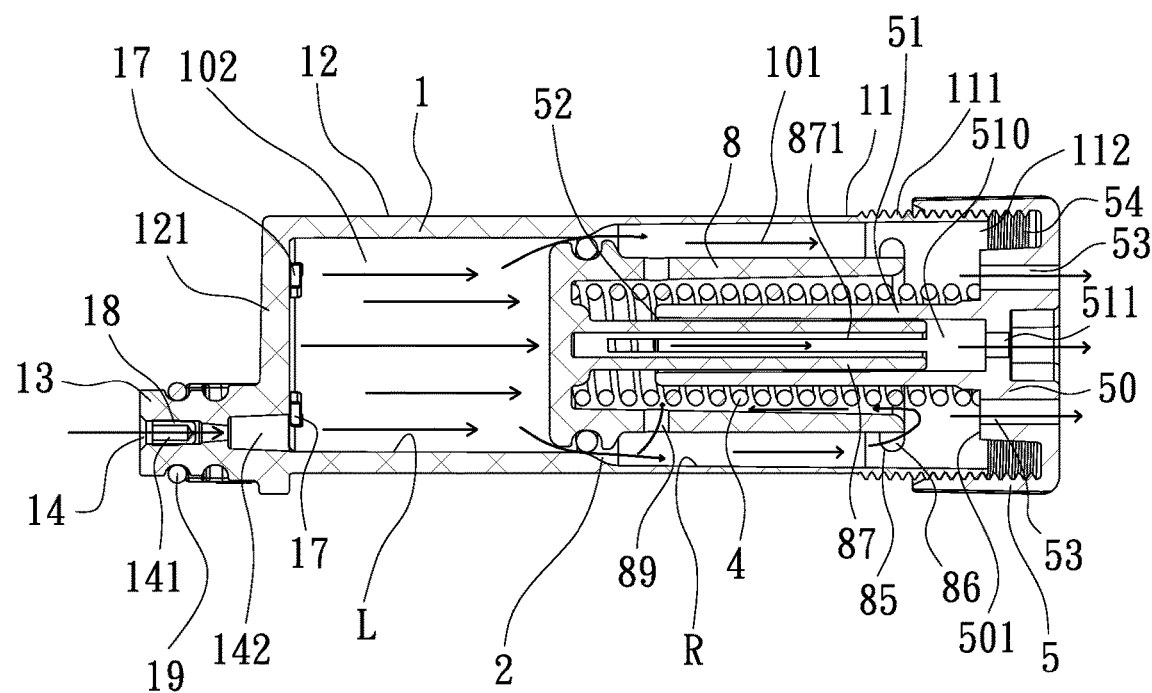
FIG. 12 shows a sectional view of the pressure indicator, wherein the third embodiment of the slider is moved to the tapered annular surface of the transparent tube by the medium which exceeds a predetermined pressure.

FIGS. 11 and 12 show a third embodiment of the slider used in the pressure indicator. The slider 8 has an open end with an annular outwardly protruding edge 85 and a closed end opposite to the open end thereof and defines therein an inner space, wherein the annular outwardly protruding edge 85 defines a plurality of spaced cuts 86. Also, the slider 8 has a central tube 87 which extends from an inner surface of its closed end, through the inner space thereof, to go beyond the open end thereof. The central tube 87 of the slider 8 defines a plurality of spaced slits 871 along its outer surface. In particular, the slider 8 defines a vent hole 89 at its surrounding wall. When the pressure of the medium supplied from an external pressure source exceeds a predetermined pressure, the slider 8 can be moved from the second bore 102 of the second segment 12 to the first bore 101 of the first segment 11. The colored O-ring of the slider 8 can reach the tapered annular surface 2 of the transparent tube 1, wherein an annular gap is existed between the colored O-ring and the tapered annular surface 2 (see FIG. 12), so that some of the excessive medium may flow through the annular gap to enter the first bore 101 of the first segment 11 and then pass through the peripheral through holes 53 to flow out of the pressure indicator. In addition, some of the excessive medium may enter the inner space of the slider 8 via the spaced cuts 86 and the vent hole 89, and then flow into the central hole 510 of the cap 5 via the slits 871 of the central tube 87 of the slider 8, and finally pass through the central through hole 511 of the cap 5 to be released into the ambient environment, so that an object connected to the external pressure source can be protected from damages due to overpressure.

In light of the foregoing, in addition to measuring the pressure of the medium supplied from an external pressure source, the pressure indicator can release excessive medium into the ambient environment when the pressure exceeds a predetermined pressure. In the pressure indicator, the transparent tube is provided with means for relieving an overpressure, wherein the tapered annular surface 2 is provided between the first bore 101 and the second bore 102 of the transparent tube 1 and cooperated with the slider 3 to achieve the pressure-relief function. In operating the pressure indicator, excessive medium can pass through the annular gap between the tapered annular surface 2 and the slider 3 to be released into the ambient environment. In addition, the pressure indicator, which has a structure different from conventional devices, can measure the pressure of the medium supplied from the external pressure source more precisely and sensitively. These features render the present invention novel and inventive.

I claim:

1. A pressure indicator comprising: a transparent tube having a first segment and a second segment, the first segment defining therein a first bore, the second segment defining therein a second bore, the first bore of the first segment having a diameter greater than the second bore of the second segment, the first segment being integrally formed with the second segment such that a tapered annular surface is formed between an inner surface of the first segment, which defines the first bore, and an inner surface of the second segment, which defines the second bore, wherein the first segment has an open end opposite to the second segment, the second segment has an end wall provided with a connection fitting defining therethrough an air channel, and the second segment is provided with a pressure-indicating scale at its outer surface; a slider mounted in the transparent tube, the slider being shaped as a hollow cylindrical body which has an open end and a closed end opposite to the open end thereof and defines therein an inner space, the slider has a central tube which extends from an inner surface of its closed end, through the inner space thereof, to go beyond the open end thereof; a coiled compression spring received in the inner space of the slider and fitted around the central tube of the slider, wherein one end of the coiled compression spring is urged against the inner surface of the closed end of the slider; and a cap having a central tube which defines therein a central hole and extends from an inner surface of the cap, the cap being threadedly mounted to the open end of the first segment of the transparent tube, an opposite end of the coiled compression spring being urged against the inner surface of the cap; whereby, when an external pressure source is connected to the connection fitting of the transparent tube, the slider is pushed by a medium supplied from the external pressure source to move along the second bore and the first bore of the transparent tube so that the pressure of the medium is measured; when the pressure of the medium exceeds a predetermined pressure, the slider is pushable to reach the tapered annular surface to allow excessive medium to be released into ambient environment via an annular gap between the slider and the tapered annular surface of the transparent tube.

2. The pressure indicator of claim 1, wherein the first bore of the first segment has a radius of X, and the second bore of the second segment has a radius of Y, wherein X is greater than Y.

3. The pressure indicator of claim 1, wherein the slider is provided with an annular outwardly protruding edge at its open end, a step is formed between the inner surface of the closed end and the central tube of the slider, the central tube of the slider defining a plurality of spaced slits along its outer surface, the slider defining at its surrounding wall, near its closed end, an annular groove to be fitted with a colored O-ring.

4. The pressure indicator of claim 1, wherein the coiled compression spring slightly contacts an inner surface of the slider that defines the inner space thereof.

5. The pressure indicator of claim 1, wherein the cap had an inner base, the central tube extending from the inner base, the central tube of the cap having a diameter less than the inner base of the cap, thus forming an annular surface therebetween, the central tube of the cap having an open end opposite to the inner base, the central hole of the central tube opening out at the open end thereof, wherein the central hole of the central tube of the cap has a diameter greater than the central tube of the slider, but the diameter of the central tube of the cap being less than the internal diameter of the coiled compression spring, the opposite end of the coiled compression spring being urged against the annular surface of the inner base of the cap.

6. The pressure indicator of claim 1, wherein the air channel is composed of a small-diameter channel and a large-diameter channel, the small-diameter channel being fitted with a buffering plug to moderate instantaneous pressure of the medium supplied from the external pressure source.

7. The pressure indicator of claim 3, wherein the annular outwardly protruding edge defines a plurality of spaced cuts.

8. The pressure indicator of claim 3, wherein the slider defines at least one vent hole at its surrounding wall.

9. The pressure indicator of claim 1, wherein the first segment is provided at its open end with external threads while the cap is provided at its inner surface with internal threads corresponding to the external threads, whereby the compression of the coiled compression spring is adjusted by the depth of the cap being threadedly mounted to the open end of the first segment, so that the pressure of the medium supplied from the external pressure source is measured more properly.

10. The pressure indicator of claim 5, wherein the inner base of the cap defines therethrough a central through hole communicating with the central hole of the cap and defines a plurality of peripheral through holes around the central through hole thereof.

* * * * *